No. 779,781. PATENTED JAN. 10, 1905.
H. HENCKEN.
DETECTOR ATTACHMENT FOR VEHICLES.
APPLICATION FILED FEB. 27, 1904.
2 SHEETS—SHEET 1.
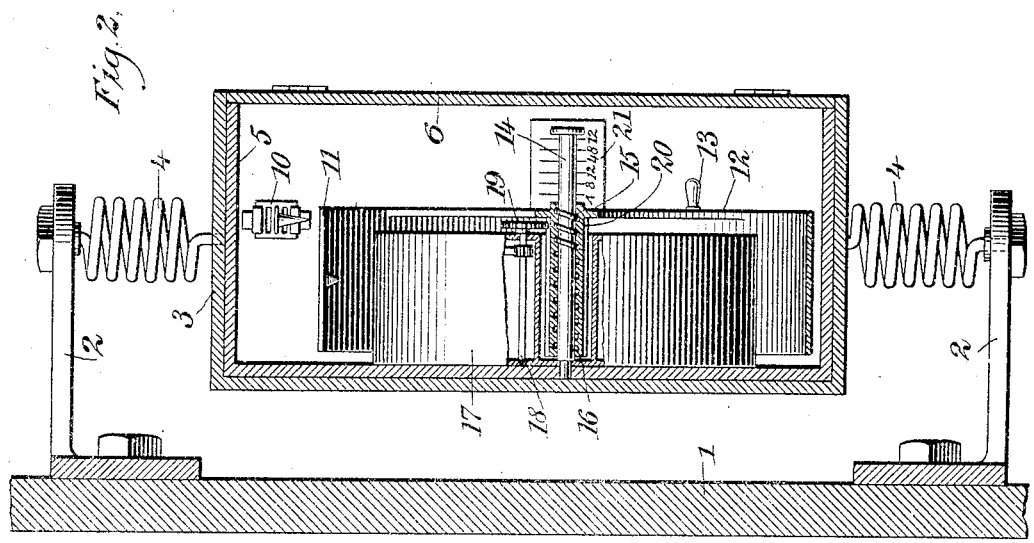
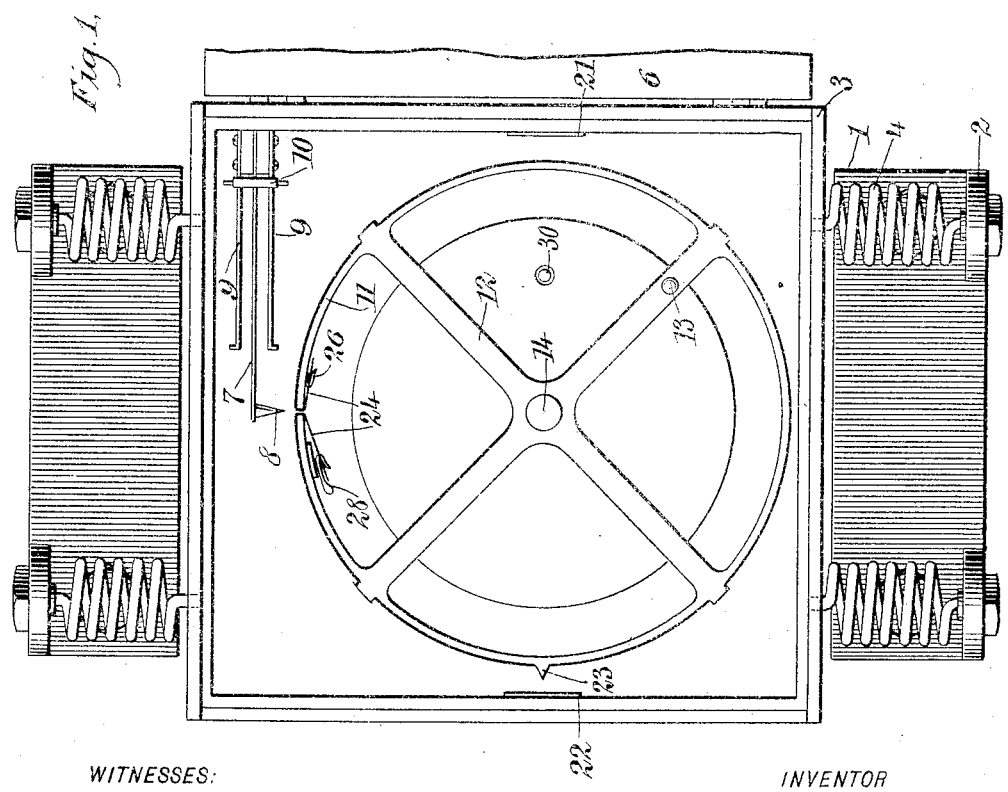
WITNESSES:
Edward Thorpe,
A. E. Fay
INVENTOR
Harry Hencken
BY
ATTORNEYS

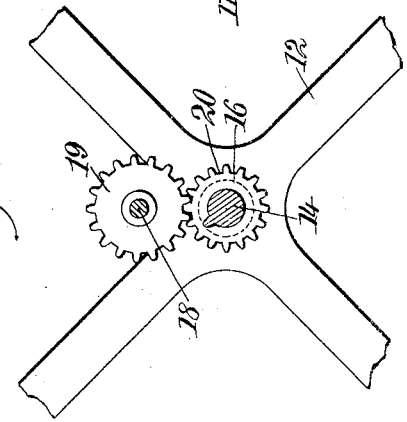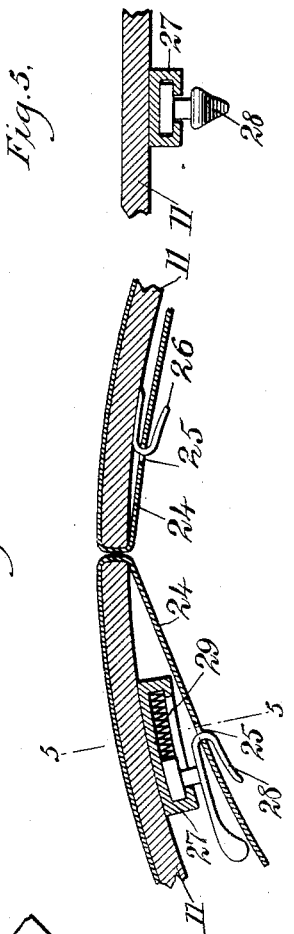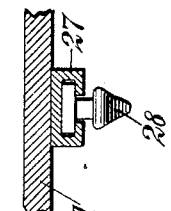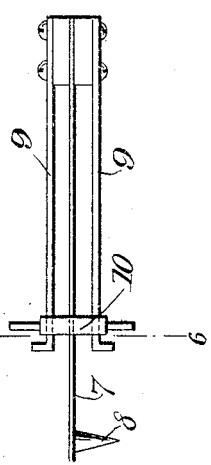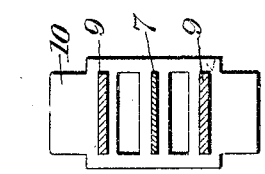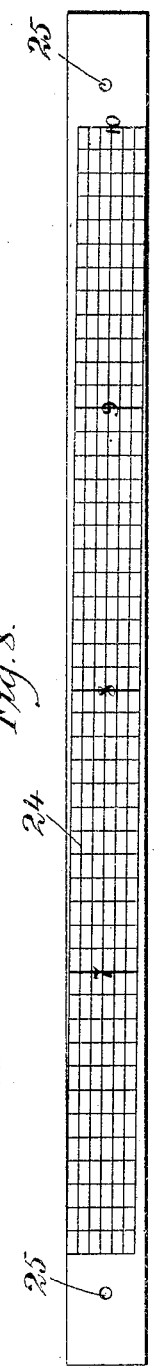

No. 779,781.                                           Patented January 10, 1905.

UNITED STATES PATENT OFFICE.

HARRY HENCKEN, OF NEW YORK, N. Y.

DETECTOR ATTACHMENT FOR VEHICLES.

SPECIFICATION forming part of Letters Patent No. 779,781, dated January 10, 1905.

Application filed February 27, 1904. Serial No. 195,660.

*To all whom it may concern:*

Be it known that I, HARRY HENCKEN, a citizen of the United States, and a resident of the city of New York, borough of Manhattan, in the county and State of New York, have invented a new and Improved Detector Attachment for Vehicles, of which the following is a full, clear, and exact description.

My invention relates to attachments to be placed upon vehicles of all descriptions for the purpose of furnishing a record of the movement of the vehicle. It is especially adapted for placing upon carriages and wagons in order to furnish a record of the driver's work to his employer.

The objects of my invention are to provide a device for making a record which will show exactly at what time and how long the vehicle was in motion and will record stops in the same way.

The device consists of a chart fastened around a cylinder, which is moved by clockwork, and a very flexible flat spring at the end of which is a point for recording upon the chart the vibration caused by the vehicle when the same is in motion.

Reference is to be had to the accompanying drawings, forming a part of this specification, in which similar characters of reference indicate corresponding parts in all the figures.

Figure 1 is a plan view of a preferred form of my invention. Fig. 2 is a sectional view of the same. Fig. 3 is a plan view of certain details of construction. Fig. 4 is a sectional view of the drum, showing the means for attaching the chart. Fig. 5 is a sectional view on the line 5 5 of Fig. 4. Fig. 6 is a sectional view on the line 6 6 of Fig. 7. Fig. 7 is a detail view showing the vibrating arm and means for stopping it, and Fig. 8 shows the form of chart used on the machine.

In the drawings, 1 represents the body or part of a vehicle, and 2 a series of standards or supports secured thereto for the purpose of holding the member or casing 3, through the instrumentality of the flexible springs 4, which are secured to the supports 2 and the casing 3 in any desired manner. Within the casing I preferably place a removable box 5, having a cover 6. This box 5 when used is adapted to contain the entire machine and is a very convenient arrangement of the apparatus, as it can be removed from the vehicle at night and kept in the office of the employer and can also be removed from the vehicle when the latter is not to be used for some time—all this without the necessity of using any tools or implements. It is of course to be understood that this box is not a necessary part of my invention and may be dispensed with, if desired, the apparatus inclosed therein being then placed in the casing 3.

Attached to the box 5 or casing 3, as the case may be, is a flat very flexible spring 7, having at its end a marking-point 8. Along the sides of this spring are preferably placed a pair of bars 9 9, along which may be moved a stopping device 10, which, as shown in Figs. 6 and 7, will prevent the vibration of the spring 7 when moved to the outer extremities of the bars 9 9.

11 is a drum provided with arms 12 at its top and a handle 13 for the purpose of setting it, as will be explained. This drum is mounted upon a vertical shaft 14, which is provided with a few screw-threads 15, working in a nut or internally-screw-threaded casing 16, attached to the center of the drum.

17 is a casing placed upon the bottom of the device, adapted to contain clockwork or other motor for operating the device. This motor transmits power in any desired manner to a shaft 18, which is provided with a gear 19, meshing with a gear or series of long teeth 20 upon the exterior of the hub 16. Upon the two opposite sides of the box (or casing, if the box is not used) are two scales 21 and 22, one of them being marked in the manner shown in Fig. 2 and the other being marked in a similar way, but with the numbers "6, 10, 2, 6, 10, 2," for a purpose to be described.

23 is a pointer upon the upper surface of the drum 11, to be used in connection with these scales.

Around the outer surface of the drum is placed a chart 24, (shown in Fig. 8,) which is provided with holes 25 at its ends for the purpose of securing it to the drum. The two edges of the drum are spaced apart, as shown in Fig. 4, for the chart to pass through to the interior. One end of the chart is secured to a hook 26, as shown in Fig. 4, and to the other side of the drum is secured a block 27, carrying a movable hook 28, pressed backwardly by a spring 29 for the purpose of securing the other end of the chart 24. In placing the chart upon the drum the hole 25 in one end is placed over the hook 26. The chart is then carried out through the passage between the ends of the drum, around the drum, and back through the same passage to the hook 28, which must be pressed forwardly against the spring 29. Upon releasing the pressure the hook is forced back into the position shown in Fig. 4, and the chart will be firmly held in position. In this construction it will be seen that the vibrations caused by the movements of the vehicle even on smooth roads will cause the spring 7 to move back and forth at a rapid rate and make a series of dots upon the chart on the drum, which is designed to move past the pointer. When the vehicle is not moving, however, no such series of dots will be made on the chart and it will be left perfectly blank during such periods. The clockwork when wound at the point 30 will cause the drum to constantly rotate, and in the present design it is intended that the drum shall rotate once in four hours. It will be noticed that one rotation of the drum will carry the drum upward the space of the pitch of the screw on the shaft 14. This is indicated by the two scales 21 and 22 in an obvious manner. All the inclined lines on the chart shown by Fig. 8 are made for the purpose of providing for this upward motion of the drum and shaft. The drum may be set by means of the handle 13 at any desired hour when the vehicle starts from the office.

It will be seen that this invention provides for an accurate and continuous record of the movements of the vehicle to which it is attached and that it is very simple in construction and is easily removable from the vehicle.

Having thus described my invention, I claim as new and desire to secure by Letters Patent—

1. A detector attachment for vehicles, comprising a support, a drum thereon, means on said drum for securing the ends of a flexible chart comprising a stationary hook, a movable hook and means for forcing said movable hook away from said stationary hook, and a marker carried by said support.

2. A detector attachment for vehicles, comprising a main member, springs for supporting said member, a drum carried by said member, means on said drum for attaching a chart thereto, a resilient marker carried with said main member, and means for preventing vibration of said marker comprising a slidable locking member having engagement with the marker.

3. A detector attachment for vehicles, comprising a casing, a drum supported thereby, means on said drum for securing the ends of a flexible chart, comprising a stationary hook, a movable hook and means for yieldingly forcing said movable hook away from said stationary hook, and a resilient marker carried by said casing.

4. The combination of a casing having scales therein indicating time, yielding means for supporting said casing, a vertical shaft supported by said casing, a pointer, a drum supported by said shaft, a screw-threaded connection between said drum and shaft, and means on said drum for supporting a flexible chart.

5. The combination of a gear, a casing, a drum in the casing, a hub on said drum having an external gear-surface provided with long teeth capable of longitudinal movement, said teeth being adapted to constantly remain in mesh with the gear during said longitudinal movement, and a clockwork located in said casing for driving the gear.

6. The combination of a gear, a clockwork connected with the gear for driving it, a casing in which said clockwork and gear are located, a drum in said casing, a hub on said drum having an external gear-surface provided with long teeth meshing with said gear and capable of longitudinal movement and screw-threads, a shaft passing through said hub and having screw-threads engaging with the screw-threads of said hub for causing the hub to travel along the shaft when it is rotated by the clockwork, said teeth being adapted to remain in mesh with said gear during said motion of the hub.

7. The combination of a casing having a scale thereon, means supported thereby for carrying a flexible chart, means for rotating said means and for simultaneously giving said first-named means a motion of translation, comprising a screw-threaded shaft and a nut, and a pointer carried by said casing.

8. The combination of a casing, a rotatable member carried thereby, a chart carried by said rotatable member and provided with characters indicating hours, a scale on said casing provided with divisions indicating hours, a pointer on said rotatable member adapted to coact with said scale, and a marker carried with said casing adapted to make marks upon said chart.

In testimony whereof I have signed my name to this specification in the presence of two subscribing witnesses.

HARRY HENCKEN.

Witnesses:
JAMES H. THOMAS,
CHARLES H. WOODWARD.